United States Patent
Darwood et al.

(10) Patent No.: US 7,242,908 B2
(45) Date of Patent: Jul. 10, 2007

(54) METHOD AND ARRANGEMENT FOR CHANNEL ESTIMATION IN A WIRELESS COMMUNICATION SYSTEM

(75) Inventors: Peter Bruce Darwood, Sheffield (GB); Alan Edward Jones, Wiltshire (GB)

(73) Assignee: IP Wireless, Inc., San Bruno, CA (US)

( * ) Notice: Subject to any disclaimer, the term of this patent is extended or adjusted under 35 U.S.C. 154(b) by 0 days.

(21) Appl. No.: 10/531,151

(22) PCT Filed: Oct. 24, 2003

(86) PCT No.: PCT/GB03/04587

§ 371 (c)(1),
(2), (4) Date: Apr. 7, 2006

(87) PCT Pub. No.: WO2004/039098

PCT Pub. Date: May 6, 2004

(65) Prior Publication Data

US 2006/0223441 A1   Oct. 5, 2006

(30) Foreign Application Priority Data

Oct. 24, 2002   (GB) ................. 0224757.5

(51) Int. Cl.
*H04B 17/00*   (2006.01)
(52) U.S. Cl. .............. 455/67.11; 455/67.13; 455/64.14; 370/280; 370/335; 370/342
(58) Field of Classification Search ......... 455/67.11, 455/67.13, 67.14, 68; 370/280, 335, 342
See application file for complete search history.

(56) References Cited

U.S. PATENT DOCUMENTS 5,627,826 A   5/1997   Kameda et al.
6,453,237 B1 *   9/2002   Fuchs et al. ............... 701/213
7,027,540 B2 *   4/2006   Wilson et al. .............. 375/354

(Continued)

FOREIGN PATENT DOCUMENTS

EP   0 551 803 A1   7/1993

(Continued)

OTHER PUBLICATIONS

3GPP (Mar. 2002). "3rd Generation Partnership Project; Technical Specification Group Radio Access Networks; BS Radio Transmission and Reception (TDD) (Release 1999)," *3GPP TS 25.105*, V3.10.0, pp. 1-39.

(Continued)

*Primary Examiner*—Nay Maung
*Assistant Examiner*—Tuan H. Nguyen
(74) *Attorney, Agent, or Firm*—Morrison & Foerster LLP (57) ABSTRACT

A method and arrangement (100) for PRACH burst channel detection in a UTRA TDD wireless communication system in which training sequences are constructed from a single periodic base code. Unwanted cross-correlation peaks, having magnitude less than correlation peaks, are removed (440) from the correlator outputs, maintaining optimal signal-to-noise ratio of the channel estimates, providing a low probability of false detection, and extending the cell size of a CDMA network to that determined by the guard period duration. The cell size can be extended further by ensuring that no transmissions are scheduled for the timeslot subsequent to that in which the channel estimation bursts are scheduled.

17 Claims, 5 Drawing Sheets

U.S. PATENT DOCUMENTS

2002/0126220 A1 9/2002 Wilson et al.
2004/0137910 A1* 7/2004 Beckmann et al. ...... 455/456.1

FOREIGN PATENT DOCUMENTS

| EP | 0 551 803 B1 | 7/1993 |
| EP | 0 827 295 A2 | 3/1998 |
| EP | 0 827 295 A3 | 3/1998 |
| EP | 0 994 570 A1 | 4/2000 |
| EP | 1 235 360 A1 | 8/2002 |
| WO | WO-02/082705 A1 | 10/2002 |
| WO | WO-2004/036857 A1 | 4/2004 |

OTHER PUBLICATIONS

3GPP (Mar. 2002). "3rd Generation Partnership Project; Technical Specification Group Radio Access Network; Physical Channels and Mapping of Transport Channels onto Physical Channels (TDD) (Release 1999)," *3GPP* TS 25.221, V3.10.0, pp. 1-51.

ETSI (Dec. 2000). "Universal Mobile Telecommunications System (UMTS); UTRA (BS) TDD; Radio Transmission and Reception (3GPP TS 25.105 version 3.5.0 Release 1999)," *ETSI* TS 125 105 V3.5.0 pp. 1-18.

Hosur, S. et al. (Sep. 2000). "Design of Cyclically Permutable Codes for PN Code Acquisition in WCDMA TDD Mode," *IEEE VTS Fall VTC2000 52nd Vehicular Technology Conference* Boston, MA, Sep. 24-28, 2000, pp. 581-587.

Koukourlis, S.S. et al. (Mar. 1995). "On the Capacity of an FFH-CDMA Packet Radio Network," *IEEE Transactions on Broadcasting* 41(1):17-22.

Lei, M. et al. (Jun. 2002). "Channel Estimation Based on Midamble in UTRA-TDD System," *Proceeding of the International Conference on Telecommunications* 2002, Beijing, China, Jun. 23-26, 2002, 2:434-438.

Search Report for GB Application No. 0224757.5 filed Oct. 24, 2002, mailed Apr. 28, 2003, one page.

Sills, J.A. (Aug. 2002). "Adaptive Power Amplifier Linearization by Digital Pre-Distortion Using Genetic Algorithms," *IEEE Radio and Wireless Conference*, Boston, MA, Aug. 11-14, 2002, pp. 229-232.

Springer, A. et al. (Sep. 2001). "Digital Predistortion-Based Power Amplifier Linearization for UMTS," *European Conference on Wireless Technology*, London, England, Sep. 27-28, 2001, pp. 185-188.

Steiner, B. et al. (Sep. 1993). "Uplink Channel Estimation in Sychronous CDMA Mobile Radio Systems with Joint Detection," *The 4th International Symposium on Personal, Indoor and Mobile Radio Communications* Yokohama, JP, Sep. 8-11, 1993, pp. 123-127.

Steiner, B. et al. (Jan.-Feb. 1994). "Optimum and Suboptimum Channel Estimation for the Uplink of CDMA Mobile Radio Systems with Joint Detection," *European Transactions on Telecommunications and Related Technologies* 5(1):39-50.

Väänänen, O. et al. (Sep. 2002). "Reducing the Peak to Average Ratio of Multicarrier GSM and EDGE Signals," *13th IEEE International Symposium on Personal, Indoor and Mobile Radio Communications*, Lisboa, PT, Sep. 15-18, 2002, 1:115-119.

\* cited by examiner

METHOD AND ARRANGEMENT FOR CHANNEL ESTIMATION IN A WIRELESS COMMUNICATION SYSTEM

FIELD OF THE INVENTION

This invention relates to wireless communication systems, and particularly (though not exclusively) to UMTS (Universal Mobile Telecommunication System) Terrestrial Radio Access (UTRA) systems operating in Time Division Duplex (TDD) mode.

BACKGROUND OF THE INVENTION

In UTRA TDD, new User Equipment (UE) firstly synchronises with the network and then transmits a random access burst using the Physical Random Access Channel (PRACH). The PRACH burst is actually received at the Node B (UMTS base station) a time t (directly proportional to the distance between the UE and Node B) later. A guard period is thus required in order to avoid interference at the Node B between the PRACH burst and another burst in the subsequent timeslot. The size of the guard period effectively limits the cell radius under normal operation.

However, the network receiver (Node B) attempts to detect the random access burst by identifying which of a possible finite set of training sequences (midambles) was transmitted by the UE, and typically this operation is performed by correlating the appropriate received samples with a local replica of each of the allowable training sequences. From each of the correlator outputs the presence of PRACH burst(s) with that particular training sequence can be ascertained. Due to the construction of the training sequences from a single periodic base code, a high probability of false PRACH detection is experienced if the cell radius (allowable distance between UE and Node B) is allowed to be too large.

The maximum cell size is thus significantly limited below that allowed by the duration of the guard period, and is consequently not ideally suited to coverage of wide areas.

Although within UTRAN there currently exists an option to only use the odd-numbered midambles derived from a single periodic code, the resultant cell size is still not ideally suited to wide area coverage and does not take full advantage of the PRACH burst guard period duration.

An alternative to the above approach for channel estimation could be to employ a zero-forcing channel estimate. However, in an asynchronous CDMA system with a potentially large cell radius, a zero-forcing channel estimate would result in a degradation in signal-to-noise ratio too high for the reliable detection and demodulation of the PRACH bursts.

A need therefore exists for PRACH detection in a wireless communication system wherein the abovementioned disadvantage(s) may be alleviated.

STATEMENT OF INVENTION

In accordance with a first aspect of the present invention there is provided an arrangement, for channel estimation in a wireless communication system, as claimed in claim 1.

In accordance with a second aspect of the present invention there is provided a method, for channel estimation in a wireless communication system, as claimed in claim 8.

In accordance with a third aspect of the present invention there is provided a method, for channel estimation in a wireless communication system, as claimed in claim 19.

DESCRIPTION OF THE DRAWINGS

One method and arrangement for PRACH detection in a UTRA TDD system incorporating the present invention will now be described, by way of example only, with reference to the accompanying drawings, in which.

DESCRIPTION OF PREFERRED EMBODIMENT

In UTRA TDD (as specified in 3GPP Technical Specification TS25.221, 'Physical channels and mapping of transport channels onto physical channels (TDD)', Version 3.10.0), new User Equipment (UE) firstly synchronises with the network and then transmits a random access burst using the Physical Random Access Channel (PRACH). The network receiver (Node B) attempts to detect the random access burst by identifying which of a possible finite set of training sequences (midambles) was transmitted by the UE.

Figure 1:
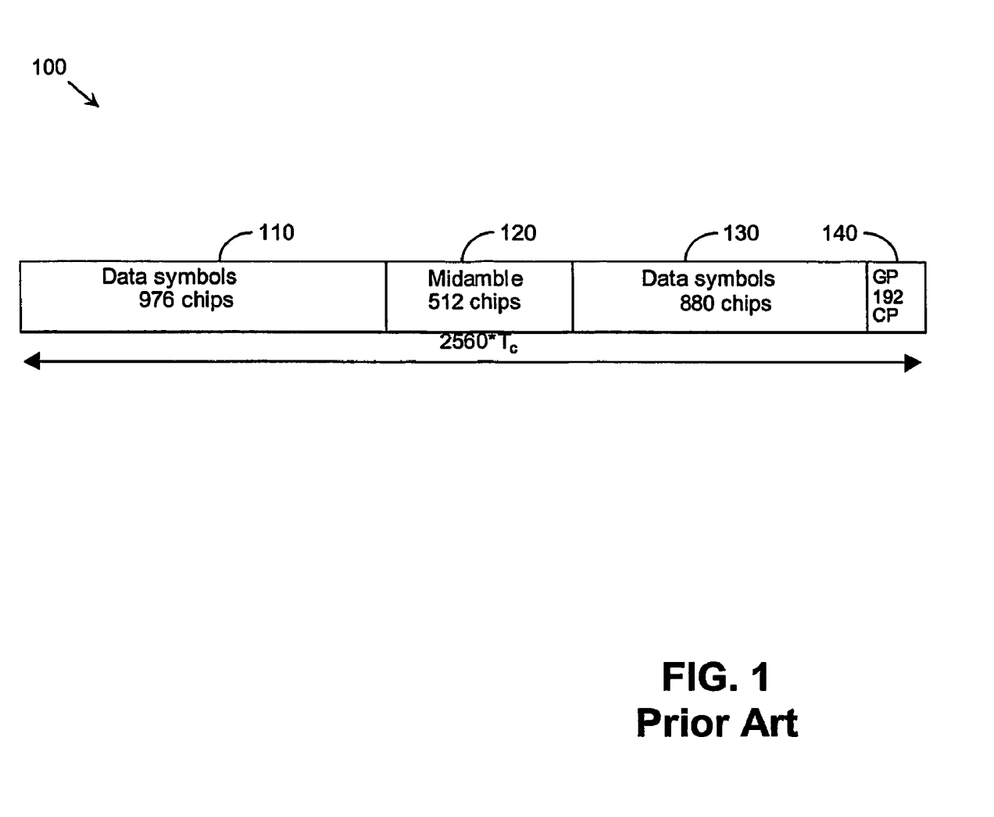
FIG. 1 shows a block schematic representation of PRACH burst structure within UTRA TDD mode at 3.84 Mcps.

Due to the construction of the training sequences from a single periodic base code, a high probability of false PRACH detection is experienced if the cell radius is allowed to be too large. FIG. 1 illustrates the format of the PRACH burst 100 in UTRA TDD mode at a chip rate of 3.84 Mcps. The PRACH burst 100 has a total length of 2560 chips, comprising:

- a first data symbol portion 110, of length 976 chips;
- a midamble portion 120 (which will be discussed in greater detail below), of length 512 chips;
- a second data symbol portion 130, of length 880 chips; and
- a guard period portion 140, of length 192 chips, where no signal is transmitted.

The UE initially has no knowledge of its distance from the Node B, and transmits its PRACH burst at the beginning of the appropriate timeslot. The PRACH burst is actually received at the Node B a time t later, related to the distance between the UE and Node B, t being given by the equation:

$$t = \frac{2 \times \text{distance}}{\text{speed of light}}.$$

The guard period 140 is thus required in order to avoid interference at the Node B between the PRACH burst and another burst in the subsequent timeslot. The size of the guard period effectively limits the cell radius under normal operation. For a typical chip rate of 3.84 Mcps this cell radius can be determined by re-arranging the above equation, to reveal a distance of 7.5 Km.

The midamble portion 120 of the PRACH burst is chosen at random from a finite set of available training sequences. The available training sequences are known a priori at the Node B, and consequently the Node B can test each of the sequences to establish if a PRACH burst with that training sequence is present.

Figure 2:
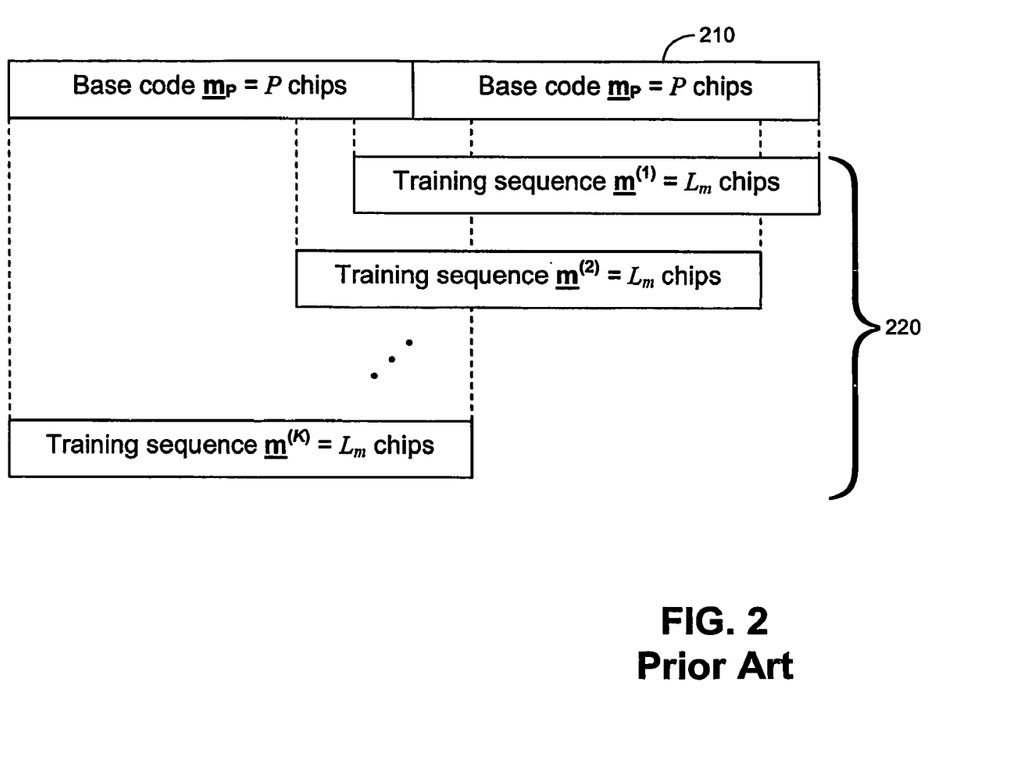
FIG. 2 shows a block schematic representation illustrating training sequence construction from base code.

Each of the training sequences to be used within a cell for PRACH bursts is related to one of two base sequences of length P chips. The sequences related to one of these particular base sequences, $m_p$ 210, are obtained by periodically extending the base sequence and then selecting $L_m$ chips every W chips. This process is repeated up to K times, as shown in FIG. 2, thus obtaining up to K midambles 220 from a single base code.

As an example of the values of the parameters in the outlined method of training sequence construction, UTRA TDD mode of operation at 3.84 Mcps may be considered:

The period of the base sequence, P=456 chips.

The length of the training sequences, $L_m$=512 chips.

Number of training sequences from a single base sequence, K=8.

The shift in base sequence between training sequences, W=57.

As can be seen from the above, the midamble length is P+W−1 as opposed to P chips. This is due to the fact that the midamble is inserted into the burst between 2 data payloads (portions 110 and 130 in FIG. 1), and thus the beginning of the midamble can suffer from intersymbol interference from the first data payload. For this reason, channel estimation is typically performed on the last P chips of the midamble.

The Node B has to decide which, if any, of the allowable training sequences have been transmitted in the timeslot(s) in which PRACH bursts are located.

Typically, this operation is performed by correlating the appropriate received samples with a local replica of each of the allowable training sequences. From each of the correlator outputs the presence of PRACH burst(s) with that particular training sequence can be ascertained.

This process is demonstrated in FIG. 3A for UTRA TDD mode of operation at 3.84 Mcps. A PRACH burst with midamble $m^{(1)}$ is transmitted and correlated with the last P chips of a local replica to provide a channel estimation peak of magnitude P at correlator output position P. However, from FIG. 3B, it can also be noted that the output of the correlation with the local replica of midamble $m^{(2)}$ has two peaks at locations of +57 and −399 chips from the peak position in the correlation output with midamble $m^{(1)}$, i.e., P. These peaks, the cross-correlation terms between midambles $m^{(1)}$ and $m^{(2)}$, are the result of the construction of the midambles from a single periodic base code.

Figure 3:
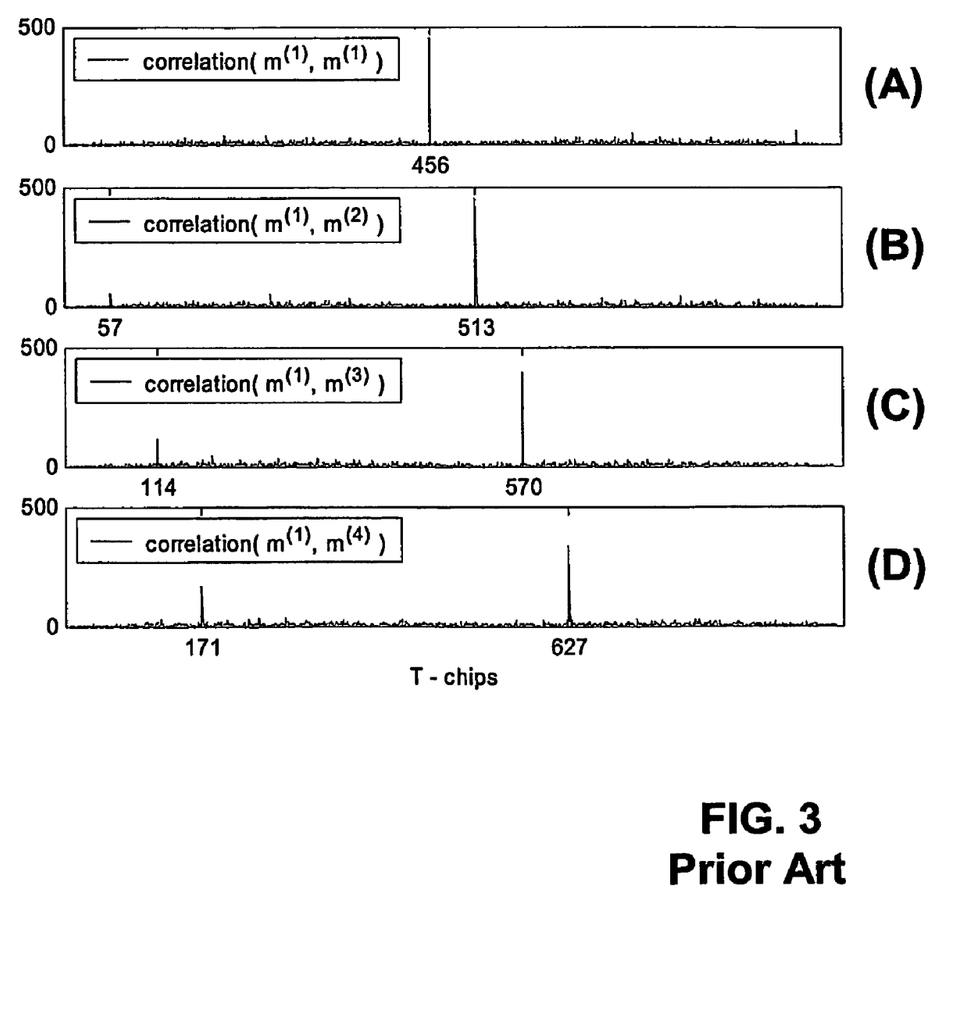
FIGS. 3A-3D show waveform diagrams illustrating respective correlator outputs for training sequences $m^{(1)}$ to $m^{(4)}$ with training sequence $m^{(1)}$ present.

This process is further demonstrated in FIG. 3C and FIG. 3D, where the cross-correlation peaks due to the correlation of midamble $m^{(1)}$ with midambles $m^{(3)}$ and $m^{(4)}$ respectively are displayed. As noted, in FIG. 3 only midamble $m^{(1)}$ is actually present; thus, the additional peaks in the other correlator outputs represent falsely detected PRACH bursts or a potential source of interference to any additional PRACH transmission channel estimates with different midambles.

As a consequence of the above discussion, it can be understood that in order to avoid the undesirable effects of the cross-correlation peaks, the maximum distance that a UE should be from a Node B should not exceed the W chip difference between the desired correlation peak and the first cross-correlation peak. However 57 chips at 3.84 Mcps corresponds to:

$$\frac{57}{3.84 \times 10^6} \cdot \frac{\text{speed of light}}{2} = 2.225 \text{ Km}.$$

The maximum cell size is thus limited to this radius, which is drastically reduced from the 7.5 Km allowed by the duration of the guard period, and is consequently not ideally suited to coverage of wide areas.

It may be noted that within UTRAN there currently exists an option to only use the odd-numbered midambles derived from a single periodic code. Comparing FIG. 3A and FIG. 3C, it can be seen that this would increase the maximum distance between a UE and a Node B to 4.45 km (114 chips). However, this cell size is still not ideally suited to wide area coverage and does not take full advantage of the PRACH burst guard period duration.

An alternative to the above approach for channel estimation could be to employ a zero-forcing channel estimate. Such an approach for a synchronous CDMA system is described in the publication by Bernd Steiner and Peter Jung, 'Uplink channel estimation in synchronous CDMA mobile radio systems with joint detection', PIMRC 1993, pp123-127. With regards to an asynchronous CDMA system, such as UTRA TDD presently under consideration, the approach described in this publication can be extended by a person of ordinary skill in the art without invention. Without going into mathematical details, with a zero-forcing approach knowledge of all possible midambles is incorporated into the channel estimation process for each of the midambles. For instance, with a correlation channel estimation, the correlator output for midamble $m^{(1)}$ requires knowledge of (local replica) midamble $m^{(1)}$. For a zero-forcing channel estimation the filter output for midamble $m^{(1)}$ requires knowledge of all possible midambles present, i.e., $m^{(1)}$ to $m^{(8)}$.

However, the well-known drawback of using a zero-forcing technique is its tendency to degrade the signal-to-noise ratio of the output channel estimation relative to that of a correlation channel estimate. This degradation grows exponentially with increasing channel estimation size, and for large cell radii can be several decibels. This problem is further exacerbated by the asynchronous nature of the CDMA system presently under consideration.

In the asynchronous system it is not known a priori which part of the received samples contains the midamble, and thus a larger set of received samples must be chosen in order to ensure that the midamble has been captured. However, this means that part of the PRACH burst data payload may have been included in the received samples, and this can be considered additional noise at the input to the channel estimator. Consequently, at the output of the channel estimator a further degradation of the signal-to-noise ratio, due to the additional input noise, can be expected relative to that of the correlation channel estimate.

From the above discussion it is clear that in an asynchronous CDMA system (such as UTRA TDD) with a potentially large cell radius, a zero-forcing channel estimate would result in too high a degradation in signal-to-noise ratio for the reliable detection and demodulation of the PRACH bursts.

Figure 4:
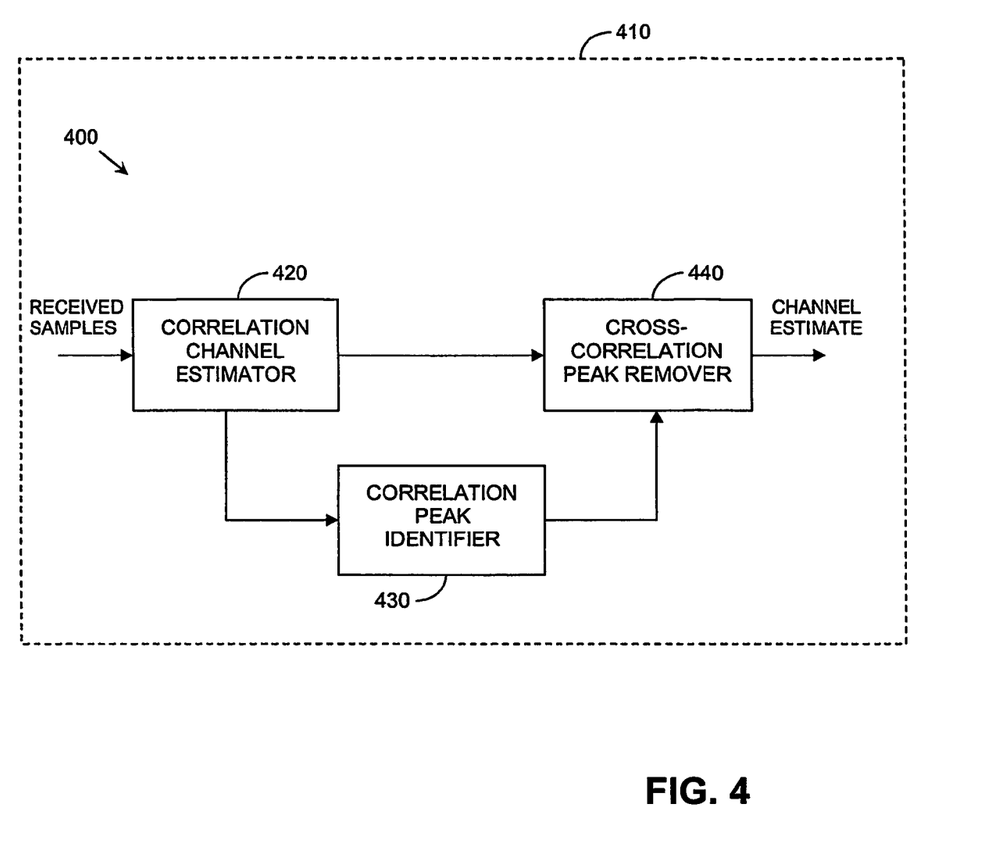
FIG. 4 shows a block schematic diagram of an arrangement for asynchronous CDMA channel estimation incorporating the present invention.

Referring now to FIG. 4, a superior approach to asynchronous channel estimation within large cell radii is shown. In the channel estimator arrangement 400 in a Node B 410, a correlation channel estimator 420 forms correlator channel estimates from received samples as described above. The output from the correlation channel estimator 420 is applied to a correlation peak identifier 430. The output of the correlation peak identifier 430 and the output of the correlation channel estimator 420 are applied to a cross-correlation peak remover 440. The cross-correlation peak remover 440 removes cross-correlation peaks from the output of the correlation channel estimator 420, without increasing the noise variance of the channel estimate, to produce an improved channel estimate output.

Based upon knowledge of the midamble construction from a single periodic base sequence, e.g., FIG. 2, an algorithm for post-processing (i.e., processing after the correlation channel estimator 420 forms correlator channel estimates from received samples as described above) is designed that is essentially able to clean up the channel estimates at the output of the correlators. The training sequences are extracted from a single periodic base code of period P chips at intervals of W chips. The length of the extracted midambles is $L_m$ chips.

If a wanted correlation peak is present in the $k^{th}$ correlator output (i.e., midamble $\underline{m}^{(k')}$) at position p, then each of the other correlator outputs will have a pair of cross-correlation peaks located at positions:

$$p+W \bmod(k-k',K) \text{ and } p+W \bmod(k-k',K)-P \quad (1)$$

where k=1, ..., K.

It is apparent that once a desired correlation peak has been identified from among the correlator outputs, the associated cross-correlation peaks may be cancelled from the other correlator outputs using the cross-correlation peak positions from (1) above. Furthermore, each of the cross-correlation peaks has a smaller magnitude than the desired correlation peak, thus making it possible to identify which peak in the correlator outputs is the desired one.

Figure 5:
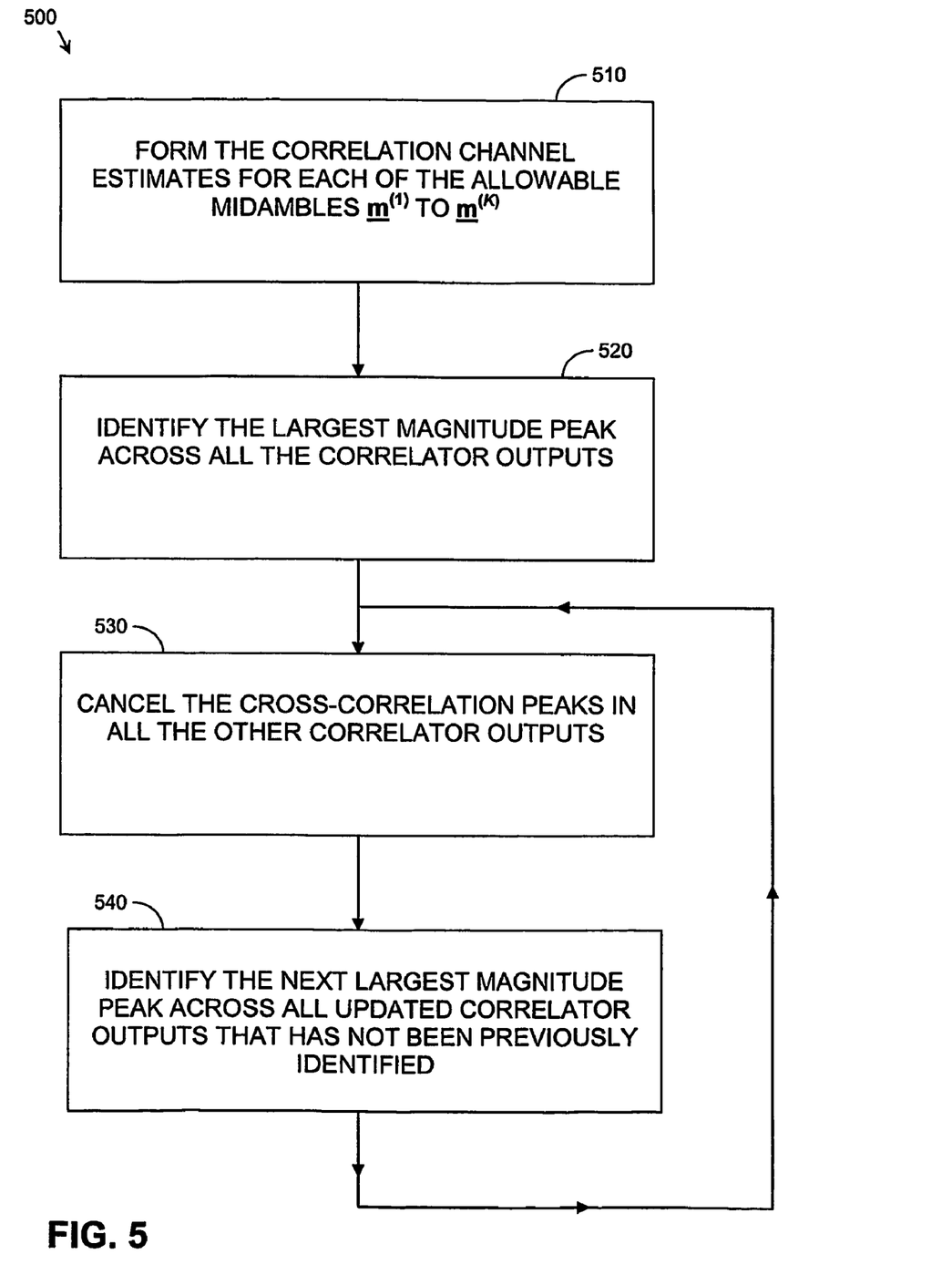
FIG. 5 shows a flow-chart diagram illustrating a method used in the system of FIG. 4.

Referring now also to FIG. 5, a suitable, but not unique, method 500 of implementing the above algorithm is described below in terms of steps:

| | |
|---|---|
| Step 1: (510) | form the correlation channel estimates for each of the allowable midambles $m^{(1)}$ to $m^{(K)}$. |
| Step 2: (520) | identify the largest magnitude peak across all the correlator outputs. For instance, assume this is located in correlator output k' at position p. |
| Step 3: (530) | cancel the cross-correlation peaks in all the other correlator outputs, i.e., k ≠ k' at locations given at (1). |
| Step 4: (540) | identify the next largest magnitude remaining peak across all updated correlator outputs that has not been previously identified. Go to Step 3. |

It can be seen that the above algorithm iterates between Step 3 (530) and Step 4 (540). One could either iterate these steps a fixed or programmable number of times. One potential method would be to iterate the steps until the magnitude of the identified peak is below a programmable threshold.

The post-processing of the correlator outputs can be performed in a number of potential ways, all of which exploit the knowledge of the construction of the midamble training sequences from a single periodic base code.

Additionally it should be noted that the described method of channel estimation with post-processing to remove unwanted cross-correlation peaks is suitable for other chip rates, and other midamble constructions. For instance, the period of the midamble base code is not restricted to 456 chips, the length of midamble is not restricted to 512 chips and the offsets for each midamble do not have to be multiples of 57 chips.

It will be appreciated that the method of channel estimation described above may be carried out in software running on a processor (not shown) in a Node B, and that the software may be provided as a computer program element carried on any suitable data carrier (also not shown) such as a magnetic or optical computer disc.

It will be also be appreciated that the method of channel estimation described above may alternatively be carried out in hardware, for example in the form of an integrated circuit (not shown) such as an FPGA (Field Programmable Gate Array) or ASIC (Application Specific Integrated Circuit) in a Node B.

Although the above method of channel estimation has been described in terms of chip spaced operation, it will be understood that the method may be employed in an oversampled system. For instance, if the correlator outputs are provided at os samples per chip and the desired peak is identified at position p in the $k^{th}$ correlator output, the other correlator outputs will have a pair of cross-correlation peaks located at positions:

$$p+os \cdot W \bmod(k-k',K) \text{ and } p+os \cdot (W \bmod(k-k',K)-P)$$

where k=1, ..., K

Implementation of the cross-correlation peak post-processing as outlined removes the unwanted peaks from the correlator outputs. This also removes the restriction upon cell size due to the unwanted cross-correlation peaks, and thus the maximum cell size is governed by the duration of the guard period. If a cell size in excess of 7.5 km is required then it would be possible for UTRAN to ensure that no transmissions were scheduled for the timeslot following the allocated PRACH timeslot. In this manner, the guard period on the PRACH burst would be effectively extended to 192+2560 chips which corresponds to a cell size in excess of 100 Km.

It will be understood that the method and arrangement for channel estimation in a wireless communication system described above provides the following advantages:
Low probability of false detection.
No degradation in the signal-to-noise ratio of the channel estimates.

It should be noted that although the invention is described in relation to the current UTRA TDD mode of operation at 3.84 Mcps, it can easily be applied to other scenarios where a burst structure with midambles or preambles formed from a single periodic code are employed. In particular, the described method of PRACH detection would be applicable to UTRA TDD modes with differing chip rates, both current and proposed.

The invention claimed is:

1. A method for channel estimation in a receiver for receiving transmissions comprising channel information, the transmission from a plurality of wireless units, the method comprising:

estimating correlations between received channel information and a plurality of midamble sequences, each midamble sequence derived from a single periodic base code;

producing estimate signals for the correlations;

identifying peaks in the correlation estimate signals; and removing identified peaks in the correlation estimate signals that correspond to cross-correlations for transmissions from wireless units other than a selected wireless unit.

2. The method of claim 1 wherein identifying includes identifying a cross-correlation peak by identifying a correlation peak with a smaller magnitude than another identified correlation peak.

3. The method of either claim 1 or claim 2, wherein the wireless communication system is a UMTS system.

4. The method of claim 3 wherein the UMTS system is a UTRA TDD system.

5. The method of claim 4 wherein the transmissions comprise random access PRACH bursts.

6. The method of any one of claims 1 or 2 wherein the step of removing cross-correlation peaks comprises repeatedly removing cross-correlation peaks by identifying a next largest correlation peak remaining after removing of a previously identified correlation peak determined to be smaller than an another identified correlation peak.

7. The method of claim 6 wherein repeatedly removing is performed a predetermined number of times.

8. The method of claim wherein 6 repeatedly removing is performed until an identified next largest peak has a magnitude less than a predetermined value.

9. The method of any one of claims 1-2 further comprising ensuring that no transmission occurs in a timeslot immediately following a times lot for which the correlation estimates were obtained.

10. A receiver for receiving from a plurality of wireless communication units signals representative of channel information, the channel information comprising midamble sequences constructed from a single periodic base code, the receiver comprising:
  a channel correlation estimator operable to receive the channel information and produce therefrom correlation channel estimate signals by correlating the channel information with midamble sequences constructed from a single periodic base code, each midamble sequence associated with a different one of the plurality of wireless communication units;
  a correlation peak identifier coupled to the correlation channel estimator, and operable to identify correlation peaks from the correlation channel estimate signals; and
  a cross-correlation peak remover coupled to the correlation channel estimator and the correlation peak identifier, and operable to remove from the correlation channel estimate signals identified cross-correlation peaks corresponding to midamble sequences of wireless communication units other than a desired wireless unit.

11. The receiver of claim 10 wherein the correlation peak identifier comprises cross-correlation peak identification means for identifying a cross-correlation peak as having a smaller magnitude than a correlation peak.

12. The receiver of claim 11 wherein the wireless communication system is a UMTS system.

13. The receiver of claim 12 wherein the UMTS system is a UTRA TDD system.

14. The receiver of claim 13 wherein the input signals comprise random access PRACH bursts.

15. An integrated circuit comprising the receiver of claim 10.

16. A receiver according to claim 10 wherein the receiver is provided in a base station of a wireless communication system.

17. A computer readable medium comprising instructions for implementing a method in a receiver, the receiver for receiving, frow a plurality of wireless units, transmissions comprising channel information, the method comprising;
  estimating correlations between received channel information and each of a plurality of midamble sequences, each midamble sequence derived from a single periodic base code;
  identifying peaks in the correlations;
  identifying one of the peaks as corresponding to a transmission from a selected wireless unit; and
  removing an identified peak in correlations that corresponds to a correlation of the received channel information and a midamble sequence associated with another of the plurality of wireless units.

* * * * *

UNITED STATES PATENT AND TRADEMARK OFFICE
CERTIFICATE OF CORRECTION

PATENT NO. : 7,242,908 B2  Page 1 of 1
APPLICATION NO. : 10/531151
DATED : July 10, 2007
INVENTOR(S) : Peter B. Darwood et al.

It is certified that error appears in the above-identified patent and that said Letters Patent is hereby corrected as shown below:

In the Claims:

Column 6, Claim 1, Line 56, delete "transmission" and insert --transmissions--.

Column 7, Claim 6, Line 14, delete "removing" and insert --removal--.

Column 7, Claim 8, Line 19, delete "claim wherein 6" and insert --claim 6 wherein--.

Column 7, Claim 9, Line 24, delete "times lot" and insert --timeslot--.

Column 8, Claim 17, Line 26, delete "frow" and insert --from--.

Column 8, Claim 17, Line 27, delete "comprising;" and insert --comprising:--.

Column 8, Claim 17, Line 36, delete "in correlations" and insert --in the correlations--.

Signed and Sealed this

Thirteenth Day of October, 2009

David J. Kappos
*Director of the United States Patent and Trademark Office*